United States Patent
Turley

(10) Patent No.: US 6,763,601 B1
(45) Date of Patent: Jul. 20, 2004

(54) TEMPLATE APPARATUS FOR GARDEN PLANTING

(76) Inventor: Stephen M. Turley, 1220 W. Concord Cntr Dr., Sullivan, WI (US) 53178

( * ) Notice: Subject to any disclaimer, the term of this patent is extended or adjusted under 35 U.S.C. 154(b) by 0 days.

(21) Appl. No.: 10/394,296

(22) Filed: Mar. 24, 2003

(51) Int. Cl.[7] .............................. G01B 3/14; A01G 1/00
(52) U.S. Cl. .............................. 33/566; 33/1 G; 47/31.1
(58) Field of Search ................................ 33/1 B, 1 AA, 33/1 BB, 1 CC, 1 G, 562, 563, 566, 1 F, 1 H; 47/31.1, 1.01 R, 58.1 SE; D10/64; 283/117

(56) References Cited

U.S. PATENT DOCUMENTS

| | | | | |
|---|---|---|---|---|
| 4,798,023 A | * | 1/1989 | Morssinkhof et al. | 47/32 |
| 4,972,628 A | | 11/1990 | Smith | 47/86 |
| 5,063,708 A | | 11/1991 | Smith | 47/33 |
| 5,246,253 A | * | 9/1993 | Mykrantz | 283/117 |
| 5,273,320 A | * | 12/1993 | deMaCarty | 283/65 |
| 5,282,317 A | * | 2/1994 | Carter et al. | 33/1 B |
| 5,370,713 A | * | 12/1994 | Hanseler | 47/1.01 R |
| 6,052,941 A | * | 4/2000 | Deichman | 47/1.01 R |
| 6,539,643 B1 | * | 4/2003 | Gleeson | 33/563 |

* cited by examiner

Primary Examiner—Christopher W. Fulton
(74) Attorney, Agent, or Firm—Robert T. Johnson

(57) ABSTRACT

A planting template sheet apparatus for, and method of planting flowers, shrubs, bulbs or seeds through apertures in the template sheet, and the apertures adjoin indicia indicating specific plant locations, and the type of plant, as indicated on a template index page.

4 Claims, 2 Drawing Sheets

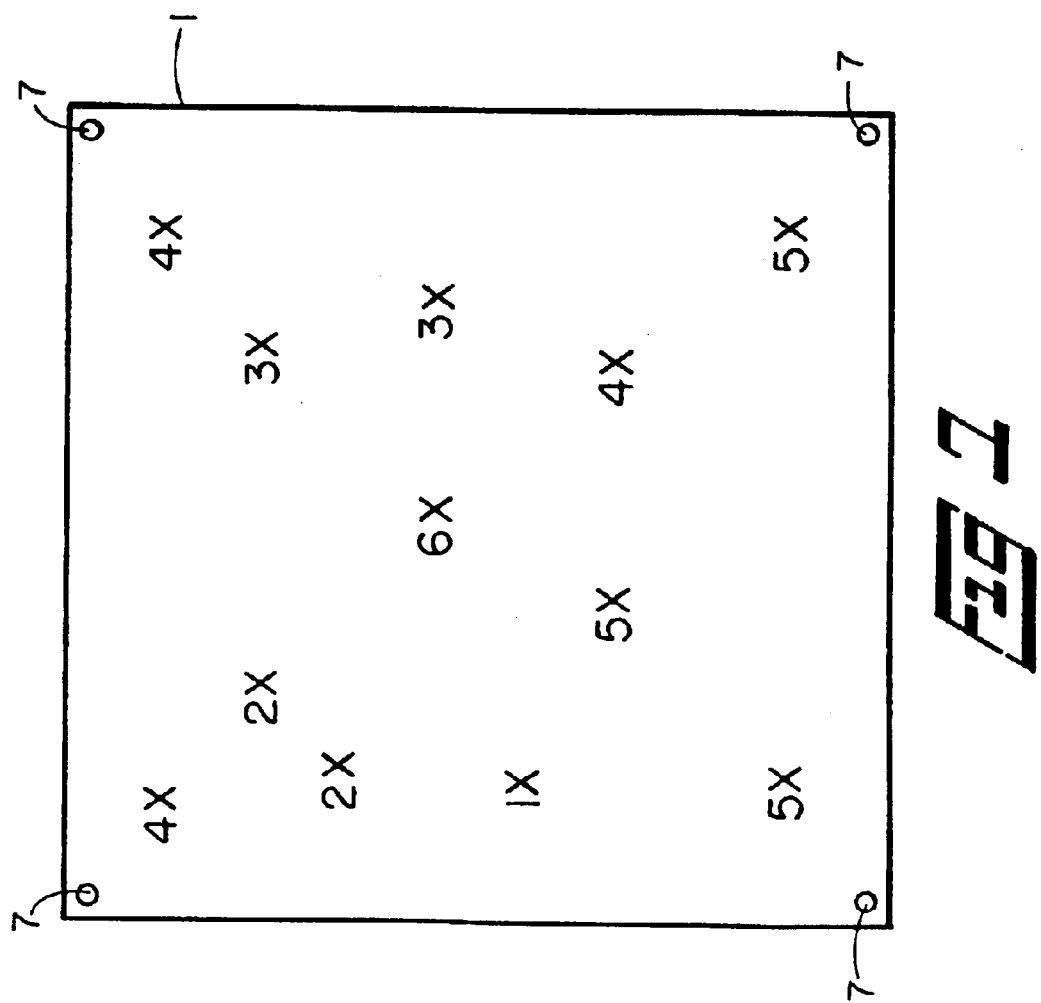

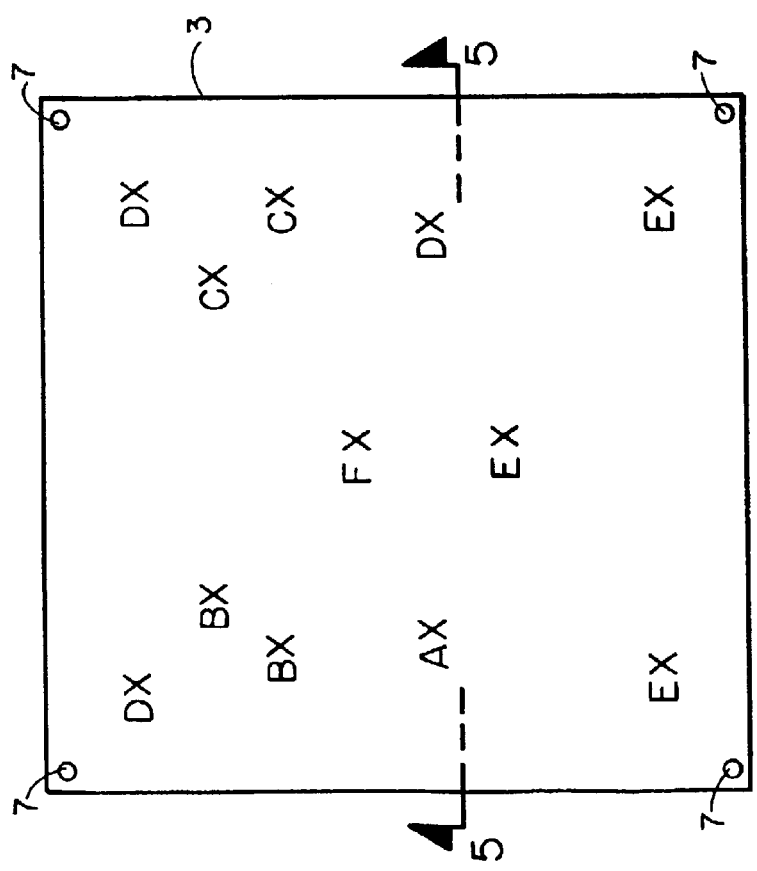
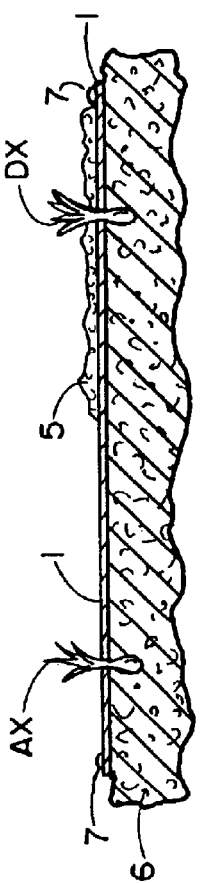

TEMPLATE APPARATUS FOR GARDEN PLANTING

SUMMARY OF THE INVENTION

This invention is to disclose apparatus and method for creating a flower, shrub, bulb or seed garden planting template sheet to coordinate planting for proper spacing and aesthetic appeal for a pleasing color balance, height and texture in the resultant flower, shrub, bulb or seed bed, and the template sheet, left in place, may also serve to inhibit weed growth in the spaces between the plantings. The planting template sheet is preferably a coarse fabric and easily enables anyone to create a garden of their choice, after preparing the soil for the planting bed and then spreading the garden planting template over the prepared soil, and then planting the various flowers, shrubs, bulbs or seeds in the garden bed soil, through the apertures or slots, at the sites indicated by number, letter insignia, indicia, or other symbols on the garden planting template.

OBJECTS OF THE INVENTION

An object of this invention is to disclose a flower or plant planting template sheet apparatus having markings for pre-selected planting sites or locations and a template index page to indicate specific flowers, shrubs, bulbs, or seeds to plant in the garden bed at the letter, number or other indicia, insignia or symbol marked areas on the garden planting template sheet, as indicated on the template index page.

Another object of this invention is to disclose a method of garden planting of flowers, bulbs, shrubs, corms or seeds or mixtures thereof, by laying a template sheet spread out on the garden soil and index indicia adjoining apertures on the template sheet, and a template index page showing plantings to be made in the apertures adjoining the index indicia on the template sheet and the plantings made in the garden soil at the apertures adjoining the index indicia in the template sheet.

PRIOR ART

U.S. Pat. No. 4,972,628 for GROUND COVER ASSEMBLY U.S. Pat. No. 5,063,708 for GROUND COVER ASSEMBLY.

None of the above prior art patents either singly or collectively anticipate or make obvious the invention disclosed and claimed in this application.

BRIEF DESCRIPTION OF DRAWINGS

| FIG. # | DESCRIPTION |
| --- | --- |
| 1 | Garden planting template with site numbers. |
| 2 | Garden planting template index page with site numbers. |
| 3 | Garden planting template with site letters. |
| 4 | Garden planting template index page with site letters |
| 5 | Cross section elevation view of mulch, garden planting template sheet and plantings in garden soil. |

DESCRIPTION OF LEGENDS

| LEGEND # | DESCRIPTION |
| --- | --- |
| 1 | Garden planting template sheet and layout site numbers. |
| 2 | 1X - 6X template master guide index page numbers |
| 3 | Garden planting template sheet and layout site letters. |
| 4 | AX - FX template master guide index page letters. |
| 5 | Mulch |
| 6 | Garden soil. |
| 7 | Template sheet anchors |

DETAILED DESCRIPTION OF THE INVENTION

This invention of a flower garden planting template to aid gardeners and landscapers, in coordinating the proper mix and spacing of flowers, shrubs, bulbs and seeds when creating a flower garden, or planting of shrubs, and is of great aid by showing what and where to plant the desired items.

Referring now to FIG. 1, showing garden planting template sheet 1, there is imprinted thereon on the upper surface of template sheet 1, garden planting template sheet indicia markings 1X–6X shown as X at planting sites, 1X–6X. As an alternate the site at the indicia could be a circle or a square, or letter, or other indicia or symbol, adjoining the X markings to indicate a specific type or color of plant to be planted in the flower or planting bed 6 through slots or apertures at the X of the numbers, letters or symbols in the template sheet 1.

A mulch 5 may be spread over the template sheet 1, which could be of biodegradable material, if so desired.

The template sheet 1 could be of paper, cloth, cheese cloth, plastic or preferably a landscape fabric such as WEED BARRIER as made by DE WITT COMPANY, 905 S.KINGSHIGHWAY, SIKESTON, Mo. 63801. This type of fabric allows for water to pass through to the planting bed and to inhibit weed growth. The weed barrier fabric may be removed from the planting bed, after the planting has been completed and re-used in other locations.

The template index pages (FIGS. 2 and 4) are listings of various flowers, shrubs, bushes, bulbs or seeds entered at a letter, number, or other indicia or symbol on the template index guide page 2 or 4, to make a template index page, which would be a master guide index for the plantings 1X–6X shown in FIG. 1, or the plantings shown AX–FX in FIG. 3.

Plants or seeds listed on the template index page, under various letters, numbers or other symbols, are planted through slots or apertures cut, either before or after, laying of the template sheet, at the same numbers, letters or symbols as listed on the template index page.

Included in this invention is other insignia besides letters or numbers to identify apertures for the plantings. Other insignias pr indicia could be circles, squares etc.

Referring now to FIG. 5, which is a cross section elevation view showing of mulch 5, on a portion of the garden planting template sheet 1, and template sheet anchors 7, which may be stakes, or soil or dirt placed on the template sheet 1, as may be required to hold the template sheet in position for planting at indicated sites.

It is to be noted that this invention is not to be limited to only 1 to 6 sites, or A to F sites, but is to include any number of plantings or sites for plantings, and further to include adjoining template sheets.

In the above disclosure "indicia" "insignia", and "symbol" are synonymous.

What is claimed is:

1. Garden planting template sheet apparatus comprising;
   a—a template sheet
   b—site index indicia on said template sheet and apertures cut in said template sheet,
   c—one each of said apertures to adjoin one each of said site index indicia,
   d—a garden planting template index page with site numbers listed on said template sheet and,
   e—said garden planting template index page listing plantings to be made at said site index indicia on said template sheet.

2. Garden planting template sheet a apparatus of claim 1 further comprising;
   said site index indicia including numbers.

3. Garden planting template sheet apparatus, of claim 1 further comprising;
   said site index indicia including letters.

4. A method of garden planting of flowers, bulbs, shrubs, corms, or seeds or mixtures thereof comprising;
   a—laying a template sheet on garden soil, said template sheet spread out on said garden soil,
   b—index indicia adjoining apertures on said template sheet,
   c—a template index page showing plantings to be made in said apertures adjoining said index indicia on said template sheet and
   d—plantings made in said apertures adjoining said index indicia.

* * * * *